(12) United States Patent
Lee et al.

(10) Patent No.: US 6,388,903 B2
(45) Date of Patent: May 14, 2002

(54) VOLTAGE COMPENSATING APPARATUS AND METHOD FOR 3-PHASE INVERTER EMPLOYING FOUR SWITCHES

(75) Inventors: Dong Myung Lee; Jae Yoon Oh; Dal Ho Cheong; Soon Bae Yang, all of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/852,036

(22) Filed: May 10, 2001

(30) Foreign Application Priority Data

Jun. 26, 2000 (KR) .............................. 00-35413
Jun. 26, 2000 (KR) .............................. 00-35414

(51) Int. Cl.[7] .................................................. H02M 1/14
(52) U.S. Cl. ........................................... 363/36; 363/40
(58) Field of Search ..................... 363/35, 40, 56.02, 363/57, 132, 135, 137, 36

(56) References Cited

U.S. PATENT DOCUMENTS 4,259,714 A * 3/1981 Zander ......................... 363/37

* cited by examiner

*Primary Examiner*—Shawn Riley
(74) *Attorney, Agent, or Firm*—Birch, Stewart, Kolasch & Birch, LLP

(57) ABSTRACT

Disclosed are a voltage compensating apparatus and method for a 3-phase inverter using four switches, to compensate for a severe distortion of a 3-phase application voltage due to a voltage ripple. The voltage compensating apparatus includes upper and lower DC link capacitors connected to each other in series and adapted to receive an input DC voltage, and to charge the DC voltage therein, a B4 inverter supplying a voltage to a 3-phase motor 1, using the four switches, when it receives the charged voltage from each of the DC link capacitors, a diodebridge receiving an AC voltage from an AC voltage source, rectifying the received AC voltage into a DC voltage, and applying the rectified DC voltage to the upper and lower DC link capacitors as the input DC voltage, and a triac coupled at an input terminal thereof to one line of the AC voltage source while being coupled at an output terminal thereof to a connection node between the upper and lower DC link capacitors, the triac serving to control whether or not the upper and lower DC link capacitors are to be charged with the DC voltage, respectively. In accordance with the present invention, the upper and lower DC link capacitors are charged through different paths, respectively. Accordingly, a control for DC link voltages is enabled to achieve a reduction in voltage ripple while minimizing a degradation in performance.

7 Claims, 7 Drawing Sheets

FIG.3
CONVENTIONAL ART
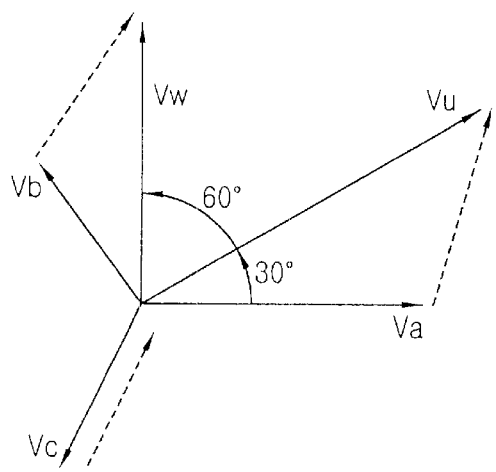
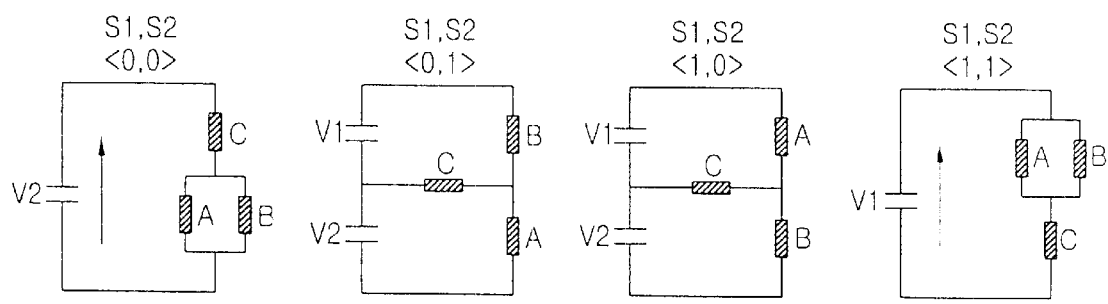
FIG.4(a) CONVENTIONAL ART
FIG.4(b) CONVENTIONAL ART
FIG.4(c) CONVENTIONAL ART
FIG.4(d) CONVENTIONAL ART

VOLTAGE COMPENSATING APPARATUS AND METHOD FOR 3-PHASE INVERTER EMPLOYING FOUR SWITCHES

BACKGROUND OF THE INVENTION

1. Field of the Invention

The present invention relates to an apparatus and method for compensating for a voltage ripple generated in a 3-phase inverter employing four switches, and more particularly to a voltage compensating apparatus and method for a 3-phase inverter employing four switches, to compensate for severe distortion in an applied 3-phase voltage due to a voltage ripple.

2. Description of the Related Art

Generally, 3-phase inverter circuits are known which use six power elements to generate a, b, and c-phase voltages, as shown in FIG. 1. As these phase voltages are supplied to a motor, the motor rotates.

However, such inverter circuits are expensive in that they use six power switching elements. In order to reduce the costs of such inverter circuits, an inverter circuit has been proposed which uses four switches to control a 3-phase motor. An example of such an inverter circuit is shown in FIG. 2.

FIG. 2 is a schematic circuit diagram illustrating a conventional 3-phase inverter employing four switches. As shown in FIG. 2, the conventional 3-phase inverter, for example, a motor controller for controlling a 3-phase electronic motor 1 includes a pair of DC link capacitors, that is, an upper DC link capacitor C1 and a lower DC link capacitor C2, connected to each other in series and adapted to receive a DC voltage rectified from an AC voltage, and to store the DC voltage therein. The 3-phase motor controller also includes a B4 inverter 2 stage configured to turn on or off in response to a switch control signal when the DC voltage from each of the capacitors C1 and C2 is supplied, thereby supplying a 3-phase voltage adapted to rotate [a] the 3-phase motor 1. The 3phase motor 1 is coupled to a connection node between the upper and lower DC link capacitors C1 and C2 coupled to respective switch legs of the B4 inverter 2.

In the case of employing four switches, the elements associated with the c-phase are eliminated. In this case, the c-phase terminal of the motor is connected to the connection node between the upper and lower DC link capacitors C1 and C2.

When a DC voltage is supplied to the upper and lower DC link capacitors C1 and C2 in the above mentioned configuration, these capacitors C1 and C2 are charged with the supplied voltage. The charged voltage from each capacitor is supplied to the B4 inverter 2.

The B4 inverter 2 supplied with the charged voltage supplies phase voltages to the motor 1 as its switches are turned on or off. The B4 inverter 2 has four switching statuses, as shown in FIGS. 4a to 4d. The following description will be made in association with the case in which the 3-phase motor has a Y-connection scheme. In the following description, "0" means an ON state of the upper switching elements in the B4 inverter 2 whereas "1" means an ON state of the lower switching elements. Where the B4 inverter 2 has a status of <0, 0>, respective lower switches of legs S1 and S2 are turned on whereas respective upper switches of the legs S1 and S2 are turned off.

Where only the upper ones of the switches respectively corresponding to the four voltage vectors of the B4 inverter 2 are switched on, that is, in a state <1, 1>, the voltage charged in the upper DC link capacitor C1, V1, is supplied to the 3-phase motor 1. In this state, no voltage is supplied from the lower DC link capacitor C2 to the 3-phase motor 1.

On the other hand, when only the lower switches are switched on, that is, in a state <0, 0>, the voltage charged in the lower DC link capacitor C2, V2, is supplied to the 3-phase motor 1. In this state, no voltage is supplied from the upper DC link capacitor C1 to the 3-phase motor 1.

In order to allow the 3-phase motor 1 to rotate, it is necessary to generate voltages of three phases each exhibiting a phase difference of 120° from one another, Va, Vb and Vc, as shown in FIG. 3.

In order to generate these voltages of three phases, one of the 3-phase voltage vectors from the B4 inverter 2 respectively applied to the 3-phase motor 1 is coupled to the connection node between the upper and lower DC link capacitors C1 and C2, and the remaining two voltage vectors are coupled to respective legs between the upper switches and the associated lower switches.

Also, a voltage vector of an inverted phase is also applied to the connection node between the upper and lower DC link capacitors C1 and C2 in order to generate voltages having the same effect as balanced 3-phase voltages. As a result, two voltage vectors respectively denoted by "Vu" and "Vw" in FIG. 2 are generated. These voltage vectors serve as respective switching functions of the legs S1 and S2 in the B4 inverter 2.

The voltage vectors Vu and Vw serve to generate balanced 3-phase voltages along with a voltage of zero-phase. That is, it is possible to obtain 3-phase balanced voltages using four switches.

The two voltage vectors Vu and Vw generated by the B4 inverter 2 have a phase difference of 60° therebetween, as shown in FIG. 3. In the case in which the c-phase of the 3-phase motor is connected to the connection node between the upper and lower DC link capacitors C1 and C2, as mentioned above, the phase of the voltage vector Vu is retarded from the a-phase voltage Va by 30°.

Therefore, where the B4 inverter 2 is controlled using pulse width modulated (PWM) pulses, it is possible to control the 3-phase motor 1 using a switching logic of the B4 inverter 2 expressed by the following Equation 1:

$$V_u = V_{a\_dc} = \left[\frac{1}{2} + \frac{1}{2} \cdot ma \cdot \sin\left(\theta - \frac{\pi}{6}\right)\right] \cdot T_{samp} \quad \text{[Equation 1]}$$

$$V_w = V_{b\_dc} = \left[\frac{1}{2} + \frac{1}{2} \cdot ma \cdot \sin\left(\theta - \frac{\pi}{2}\right)\right] \cdot T_{samp}$$

where, "θ" represents the rotor position, "ma" represents the modulation rate, and "$T_{samp}$" represents the switching sampling time.

The above Equation 1 is associated with the case in which the c-phase of the 3-phase motor is connected to the connection node between the upper and lower DC link capacitors. Referring to Equation 1, it can be found that the voltages Vw and Vu have a phase difference of 60° therebetween, and the voltage Vu is retarded in phase from the voltage Va by 30°. That is, there is an ON time ranging within the phase difference and phase retardation, for the sampling time.

Accordingly, the sampling time can be controlled using the ON time. Therefore, it is possible to control the 3-phase motor using four switching elements.

The interline voltage in the above mentioned conventional B4 inverter corresponds to the voltage across the upper DC link capacitor or the voltage across the lower DC link capacitor in accordance with the switching status of the B4 inverter. However, since the interline voltage results from the current supplied from only one capacitor, that is, the upper or lower DC link capacitor, the voltage ripple of each capacitor is rendered to be considerably high. Where the respective voltages across the capacitors are equal to each other, no phase variation occurs in the 3-phase voltage vectors. However, where the voltages respectively across the capacitors are different from each other, respective interline voltages corresponding to the switching states may have different levels and different phases, thereby resulting in a degradation in performance. For example, where the voltage V1 across the upper DC link capacitor and the voltage V2 across the lower DC link capacitor 4 are equal to each other, voltage vectors generated from the B4 inverter are orthogonal from one another, as shown in the left side of FIG. 5. However, where the voltages V1 and V2 are different from each other, voltage vectors distorted in level and phase are generated, as shown in the right side of FIG. 5. Also, where the voltages V1 and V2 are equal to each other, a normal voltage, V*, is applied, as shown in the left side of FIG. 6. However, where the voltages V1 and V2 are different from each other, voltages distorted in level and phases are applied as shown on the right side in FIG. 6, thereby resulting in a degradation in performance.

SUMMARY OF THE INVENTION

The present invention has been made in view of the above mentioned problems involved in the related art, and an object of the invention is to provide a voltage compensating apparatus and method for a 3-phase motor using four switches, which are capable of compensating for a voltage ripple.

Another object of the invention is to provide a voltage compensating apparatus and method for a 3-phase motor using four switches, in which respective charging paths of upper and lower DC link capacitors each adapted to supply voltage to a B4 inverter are different from each other, so as to reduce a voltage unbalance, thereby preventing a degradation in performance.

Another object of the invention is to provide a voltage compensating apparatus and method for a 3-phase motor using four switches, in which the voltage at a connection node between two capacitors connected to each other in series is compared with a DC link voltage to be charged in the capacitors, in order to compensate for switching functions by a DC offset corresponding to the difference between the compared voltages in accordance with a triangular wave comparison algorithm, thereby compensating for a severe distortion of a 3-phase applied voltage resulting from voltage ripple.

Another object of the invention is to provide a voltage compensating apparatus and method for a 3-phase motor using four switches, which is capable of allowing the voltage compensation of switching functions according to a triangular wave comparison algorithm, irrespective of the connection type of a motor to be controlled, for example, a Y-connection type or a Δ-connection type.

In accordance with one aspect, the present invention provides a voltage compensating apparatus for a 3-phase inverter using four switches, comprising: upper and lower DC link capacitors connected to each other in series and adapted to receive an input DC voltage, and to charge the DC voltage therein; a B4 inverter for supplying a voltage to the 3-phase motor 1, using four switches, when it receives the charged voltage from each of the DC link capacitors; rectifying means for receiving an AC voltage from an AC voltage source, rectifying the received AC voltage into a DC voltage, and applying the rectified DC voltage to the upper and lower DC link capacitors; and a triac coupled at an input terminal thereof to one line of the AC voltage source while being coupled at an output terminal thereof to a connection node between the upper and lower DC link capacitors, the triac serving to control whether or not the upper and lower DC link capacitors are to be charged with the DC voltage, respectively.

In accordance with another aspect, the present invention provides a voltage compensating method for a 3-phase inverter using four switches, comprising the steps of: detecting a zero-crossing point of an input AC voltage using an interrupt having a frequency of 120 Hz; reading voltages respectively across upper and lower DC link capacitors charged with the input voltage, for thereby checking voltage ripples involved in the capacitor voltages; controlling a delay time from the zero-crossing point, based on the checked ripples; and generating a triac control signal for thereby switching on the triac when the controlled delay time elapses.

The step of generating the triac control signal may comprise a substep of generating the triac control signal in response to a negative polarity (−) of the input AC voltage if the voltage across the upper DC link capacitor is higher than the voltage across the lower DC link capacitor.

The step of generating the triac control signal may further comprise a substep of generating the triac control signal in response to a positive polarity (+) of the input AC voltage if the voltage across the lower DC link capacitor is higher than the voltage across the upper DC link capacitor.

The triac control signal may be generated at a point in time when the input AC voltage has a predetermined voltage level.

BRIEF DESCRIPTION OF THE DRAWINGS

The above objects, and other features and advantages of the present invention will become more apparent from the following detailed description taken in conjunction with the drawings, in which:

FIG. 3 is a diagram illustrating 3-phase voltage vectors having a phase difference of 120° from one another, along with 2-phase voltage vectors having a phase difference of 60° therebetween, the voltage vectors being used to rotate a 3-phase motor;

FIGS. 4a to 4d are schematic circuit diagrams respectively illustrating different connections established between a Y-connection 3-phase motor and a DC link in accordance with different switching states, respectively, in the configuration of FIG. 2;

DESCRIPTION OF THE PREFERRED EMBODIMENTS

Figure 9:
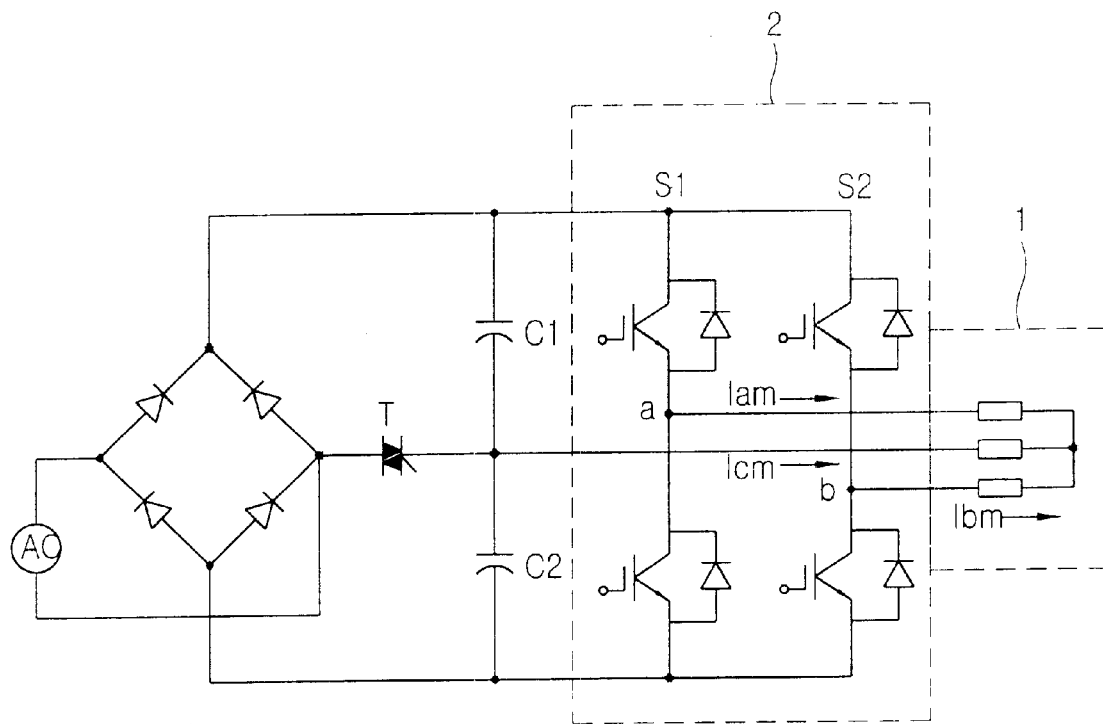
FIG. 9 is a schematic circuit diagram illustrating a voltage compensating circuit for a 3-phase inverter using four switches in accordance with the present invention.

FIG. 9 is a schematic circuit diagram illustrating the configuration of a voltage compensating circuit for a 3-phase inverter using four switches in accordance with the present invention. As shown in FIG. 9, the voltage compensating circuit includes upper and lower DC link capacitors C1 and C2 connected to each other in series and adapted to receive an input DC voltage, and to charge the DC voltage therein. The voltage compensating circuit also includes a B4 inverter 2 stage supplying voltages to a 3-phase motor 1, using four switches, when it receives the charged voltage from each of the DC link capacitors C1 and C2, and a diodebridge BD receiving an AC voltage from an AC voltage source, and rectifying the received AC voltage into a DC voltage, that is, the input DC voltage. The voltage compensating circuit further includes a triac T coupled at an input terminal thereof to one line of the AC voltage source while being coupled at an output terminal thereof to a connection node between the upper and lower DC link capacitors C1 and C2. The triac T serves to control whether or not the capacitors C1 and C2 are to be charged with the DC voltage, respectively.

Now, the operation, function, and effect of the voltage compensating circuit having the above mentioned configuration according to the present invention will be described in detail.

Figure 7A:
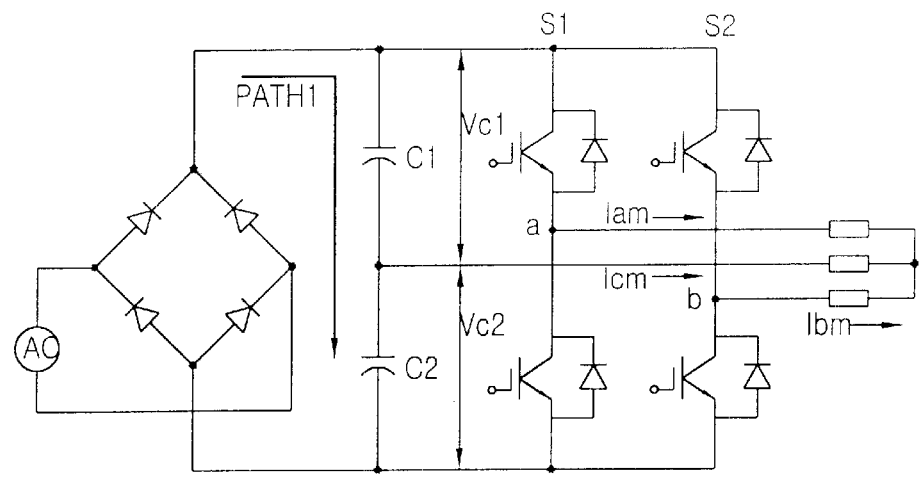
FIG. 7A is a schematic circuit diagram illustrating an inverter implemented by applying a rectifying circuit to the configuration of FIG. 2.

FIG. 7A illustrates the case in which a B4 inverter stage is applied to a general rectifying circuit in order to compensate for a voltage ripple.

In the case of FIG. 7A, when a DC voltage rectified by the diodebridge is supplied to the B4 inverter stage, it is always charged in the capacitors C1 and C2 along a path Path1. Accordingly, the capacitors C1 and C2 are charged with the same quantity of charge.

Since the capacitors C1 and C2 are charged with the same quantity of charge in spite of the fact that the voltage across the capacitor C1 is less than the voltage across the capacitor C2 due to the characteristics of the B4 inverter stage using four switches, the capacitor C1 is charged with a voltage of 110 V whereas the capacitor C2 is charged with a voltage of 220 V. The same effect occurs in the case in which the voltage across the capacitor C1 is more than the voltage across the capacitor C2.

For this reason, where a high voltage ripple is generated, it is necessary to provide a voltage compensation using hardware, taking into consideration the charging path. Of course, where a low voltage ripple is generated, the voltage compensation may be achieved using software.

In the present invention, accordingly, it is intended to achieve a voltage compensation using the characteristics of a voltage distribution circuit.

Figure 8:
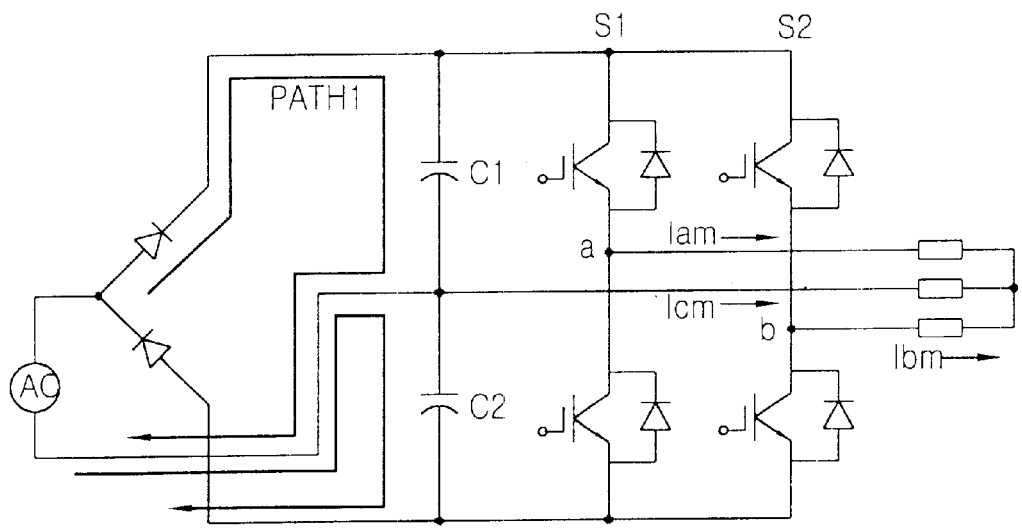
FIG. 8 is a schematic circuit diagram illustrating an inverter implemented by applying a voltage distribution circuit to the configuration of FIG. 2.

Prior to a description of the present invention, the voltage distribution circuit will be described in conjunction with the case in which the voltage distribution circuit is applied to a B4 inverter stage, as shown in FIG. 8.

In the circuit configuration of FIG. 8, the capacitors C1 and C2 have different charging paths, respectively. Since there is no occasion that the capacitors C1 and C2 are simultaneously charged, only the capacitor at which a voltage ripple is generated, is charged.

However, where such a voltage distribution circuit is used in areas having 220 V power distribution, the DC link voltage can exceed 660 V, that is, the rating voltage for power switching elements. For this reason, it is impossible to apply the voltage distribution circuit.

In accordance with the present invention, therefore, a desired voltage compensation is achieved using the characteristics of the voltage distribution circuit and a general rectifying diode. This will be described in conjunction with FIG. 9.

In the configuration shown in FIG. 8, when an AC voltage is inputted, it is rectified by the diodebridge BD, and then transmitted to the upper and lower DC link capacitors C1 and C2 so that it charges the upper and lower DC link capacitors C1 and C2.

Figure 10A:
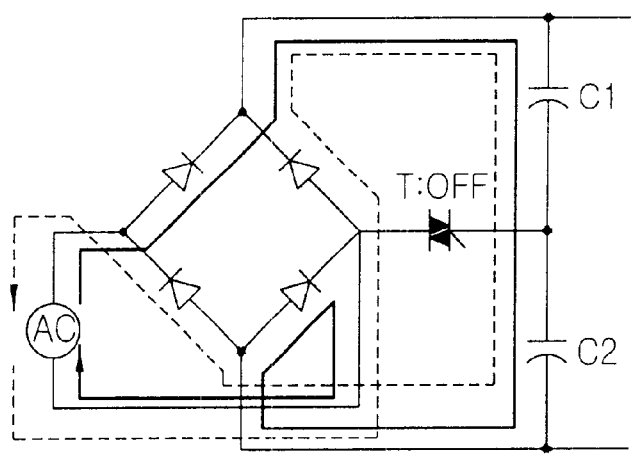
FIGS. 10A and 10B are circuit path diagrams illustrating charging and discharging operations conducted in the configuration of FIG. 9 in accordance with switching operations of a triac, respectively.
Figure 10B:
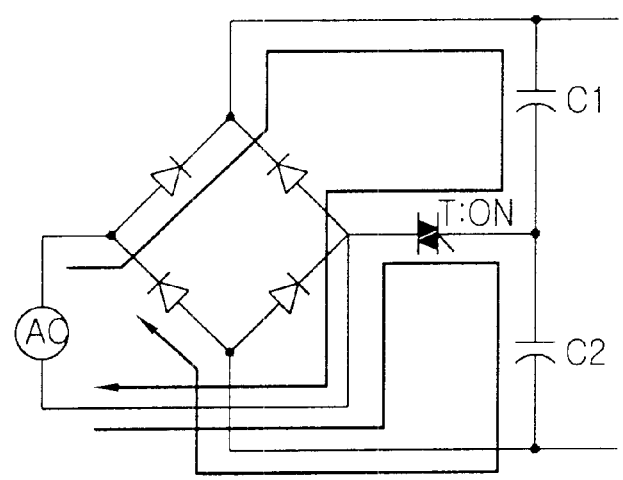

When the triac T is in its OFF state during the above mentioned charging operation, the upper and lower DC link capacitors C1 and C2 are simultaneously charged with the rectified voltage, as shown in FIG. 10A. When the triac T is switched to its ON state, different charging paths, that is, paths Path1 and Path2, are established because one line of the AC voltage source is connected to the connection node between the upper and lower DC link capacitors C1 and C2 connected to each other in series, as shown in FIG. 10B.

An AC voltage has polarities respectively defined as positive voltage and negative voltage, as shown in FIG. 11A. Due to the characteristics of the diodebridge, current flows respectively corresponding to the positive and negative voltages are different from each other. In the case of FIG. 10A, current flows in a direction indicated by the solid line arrow when the AC voltage has a positive polarity. On the other hand, when the AC voltage has a negative polarity, current flows in a direction indicated by a dashed line. In this state, of course, the triac is in its OFF state. In the case of FIG. 10B, the upper DC link capacitor C1 is charged when the polarity of the AC voltage is positive. On the other hand, when the AC voltage has a negative polarity, the lower DC link capacitor C2 is charged.

Therefore, where the voltage across the upper DC link capacitor C1 is detected to be less than the voltage across the lower DC link capacitor C2, the triac is switched to its ON state when the input voltage has a positive polarity, thereby establishing a first current path. Where the voltage across the lower DC link capacitor C2 is detected to be less than the voltage across the upper DC link capacitor C1, the triac is switched to its OFF state in response to a negative polarity of the input voltage, thereby establishing a second current path.

Thus, it is possible to solve the problem resulting from a simultaneous charging of the upper and lower DC link capacitors C1 and C2 by charging those capacitors through different charging paths.

Figure 11:
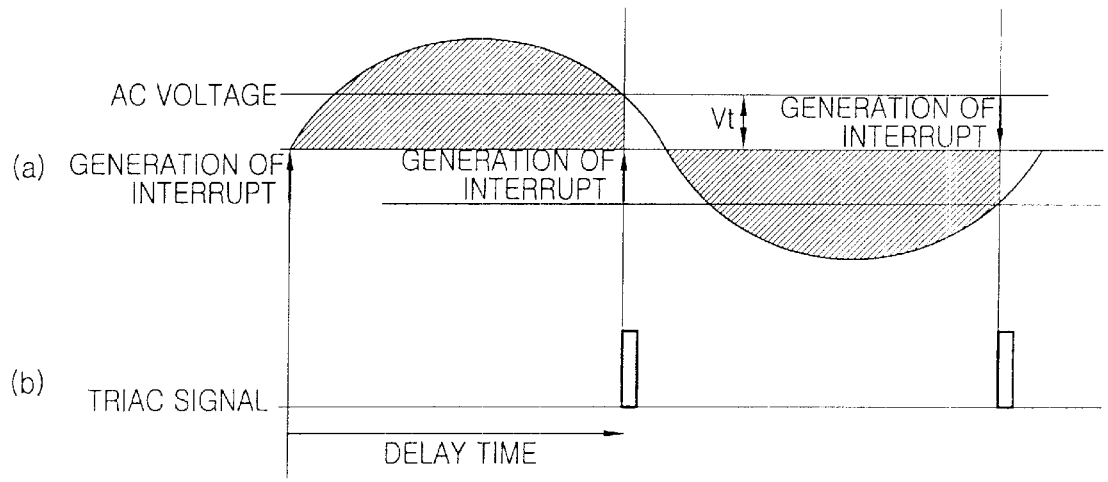
FIG. 11 is a waveform diagram illustrating the controlling of the triac depending on the applied AC voltage.
Figure 12:
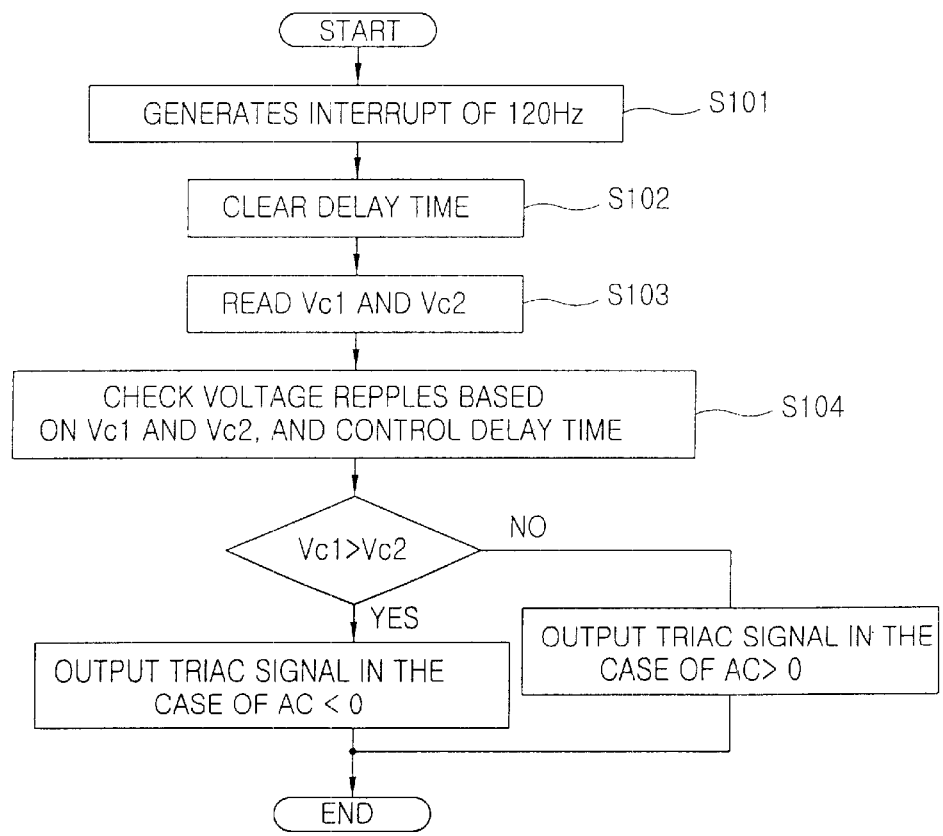
FIG. 12 is a flow chart illustrating a voltage compensating method for a 3-phase inverter using four switches in accordance with the present invention.

Therefore, it is necessary to control the triac in accordance with the polarity of the input voltage by comparing the voltages respectively across the capacitors C1 and C2 with each other. Since it is impossible to conduct a turn-off control for the triac, the practical charging time is determined by the point in time when the triac is switched to its ON state. In other words, the period of time, for which the charging of the capacitors C1 and C2 is carried out in the ON state of the triac, is increased as the delay time is reduced, as shown in FIG. 11. An interrupt for switching on the triac is generated at a particular point of the input voltage. The interrupt is adapted to control the quantity of charged voltage. In order to allow the capacitors C1 and C2 to be charged with the same voltage, it is necessary to control the degree of charge for the capacitor insufficiently charged. The degree of charge is determined by how much time do the point of time, when the triac is switched on, precedes the zero-crossing point of the input voltage.

Therefore, if the delay time for the point in time, when the triac is switched, is appropriately set with respect to the zero-crossing point of the input voltage, it is then possible to control the degree of charge as the triac is switched on at a particular point of the input voltage. When the input voltage is lower than the charged voltage, the triac is switched off, thereby causing the charging operation to be stopped. Where the input voltage has a frequency of 60 Hz, the interval of zero-crossing points is 120 Hz.

In order to control the motor, therefore, the polarity of the input voltage, at which the triac is switched on, is determined by comparing the voltages respectively across the capacitors C1 and C2 with each other. Thereafter, the delay time for the ON state of the triac is determined to allow the triac to be switched on at the point of time delayed from the zero-crossing point of the input voltage by the determined delay time. As the triac is switched on, the charging operation of the associated capacitor is carried out. The control for allowing the voltages respectively across the capacitors C1 and C2 to be equal to each other is achieved by appropriately increasing or reducing the delay time.

In FIG. 11, "Vt" represents the level of the input voltage actually exhibited at the point in time when the triac is switched on. Only when the voltage Vt is higher than the voltage across the capacitor to be charged is the triac is rendered to be conductive, thereby allowing the capacitor to be charged.

Figure 7B:
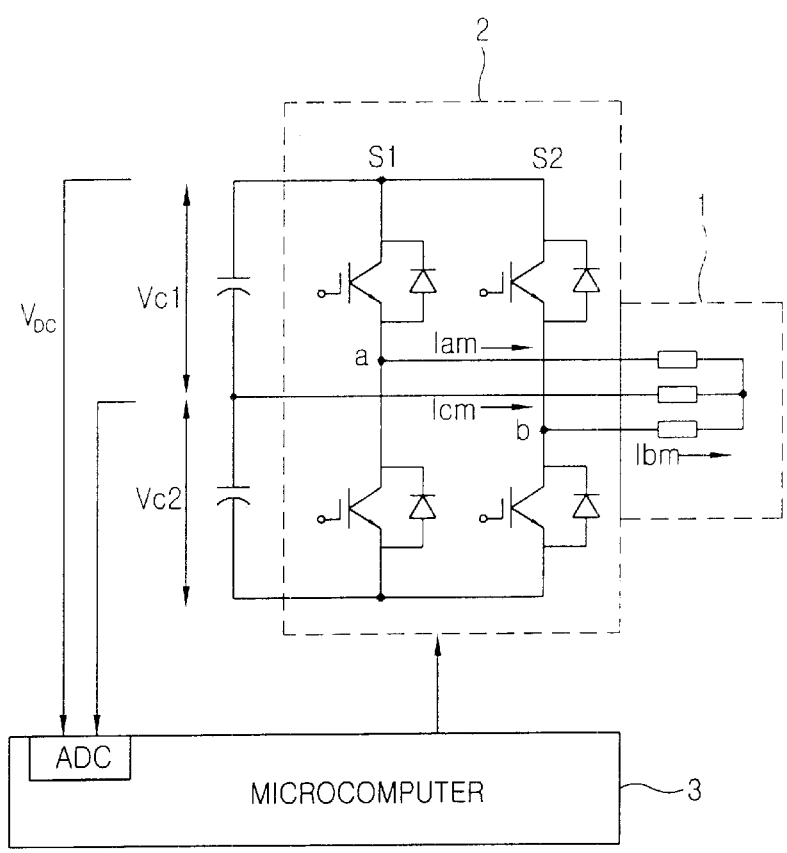
FIG. 7B is a schematic circuit diagram illustrating a voltage ripple compensating circuit for a 3-phase inverter using four switches in accordance with the present invention.

The above control operation will now be described in detail, in conjunction with FIG. 7B. A microcomputer, which is shown in FIG. 7B, reads the respective voltages across the upper and lower DC link capacitors C1 and C2, thereby checking the level of a voltage ripple. Based on the voltage ripple level, the microcomputer controls the delay time for the ON state of the triac.

For example, where the voltage ripple level is low, the delay time is correspondingly reduced to increase the charging time for the associated capacitor. On the other hand, where the voltage ripple level is high, the delay time is correspondingly increased to reduce the charging time for the associated capacitor.

After the delay time, a triac control signal is outputted. That is, the microcomputer generates a triac signal as shown in FIG. 11b in response to a negative polarity (−) of the input AC voltage, when it determines that the voltage Vc1 across the upper DC link capacitor C1 is higher than the voltage Vc2 across the lower DC link capacitor C2 (Vc1>Vc2), thereby switching on the triac T.

As the triac T is switched on, the lower DC link capacitor C2 is charged through the path Path2, as shown in FIG. 10B.

Since the AC voltage has a level of Vt at the point of time when the microcomputer generates the triac control signal, as shown in FIG. 11, the charging operation of the lower DC link capacitor C2 is carried out when the voltage across the capacitor C2 is lower than the level of Vt.

On the other hand, where the voltage Vc2 across the lower DC link capacitor C2 is higher than the voltage Vc1 across the upper DC link capacitor C1 (Vc2>Vc1), the microcomputer generates the triac signal in response to a positive polarity (+) of the input AC voltage, thereby switching on the triac T.

As the triac T is switched on, the upper DC link capacitor C1 is charged through the path Path1, as shown in FIG. 10B.

The charged voltage may be controlled by controlling the delay time based on the voltage ripple level.

FIG. 7B illustrates a voltage ripple compensation circuit for a 3-phase inverter using four switches in accordance with another embodiment of the present invention. In FIG. 7, elements respectively corresponding to those in FIG. 9 are denoted by the same reference numerals. As shown in FIG. 7B, the voltage ripple compensation circuit includes upper and lower DC link capacitors C1 and C2 connected to each other in series and adapted to receive an input DC voltage, and to charge the DC voltage therein. The voltage ripple compensating circuit also includes a B4 inverter 2 stage adapted to be switched on or off in accordance with a switch control signal when it receives the charged voltage from each of DC link capacitors C1 and C2, to rotate a 3-phase motor 1. The 3-phase motor 1 is coupled to switch legs of the B4 inverter 2 so that it is driven. The voltage ripple compensating circuit further includes a microcomputer 3 for comparing the DC link voltages with the voltage exhibited at the connection node between the capacitors C1 and C2 to derive a potential difference, and compensating for a DC offset corresponding to the derived potential difference, Now, the operation, function, and effect of this voltage ripple compensating circuit will be described in detail.

In the case of employing four switches, the series-connected upper and lower DC link capacitors C1 and C2 are charged with a DC voltage when the DC voltage is supplied. The voltage charged in each capacitor is then supplied to the 3-phase motor 1 in the form of a 3-phase voltage generated in accordance with the switching status of the B4 inverter 2.

Figure 5:
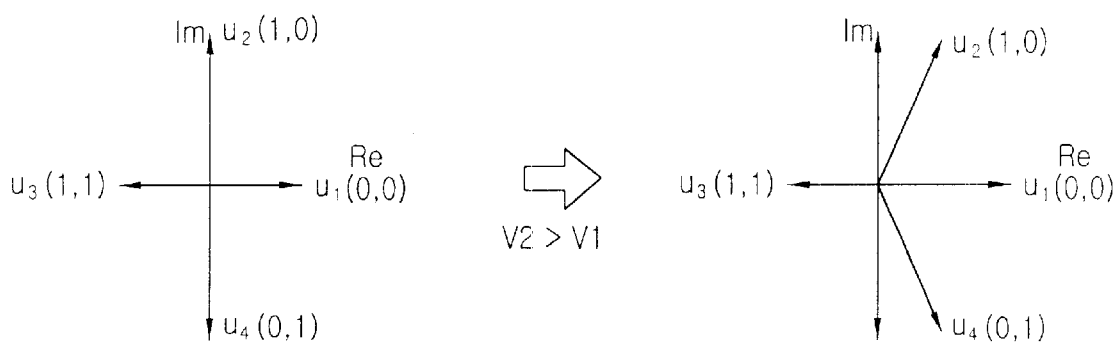
FIG. 5 is a diagram depicting voltage vectors respectively generated in the case in which the voltages across the upper and lower capacitors are equal to each other in the configuration of FIG. 2 and in the case in which the voltage across the lower capacitor is higher than the voltage across the upper capacitor.
Figure 6:
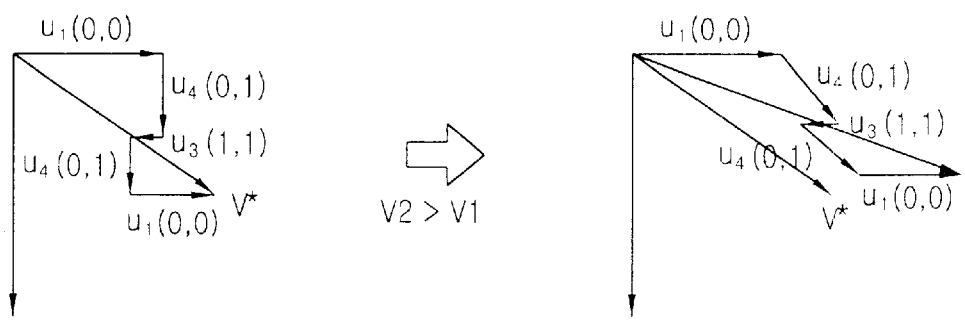
FIG. 6 is a diagram depicting actual voltage vectors respectively generated in the case in which the voltage across the upper and lower capacitors are equal to each other in the configuration of FIG. 2 and in the case in which the voltage across the lower capacitor is higher than the voltage across the upper capacitor.

The B4 inverter 2 has four switching states, as shown in FIG. 4.

Where the voltage V1 across the upper DC link capacitor and the voltage V2 across the lower DC link capacitor 4 are equal to each other, voltage vectors generated from the B4 inverter 2 are orthogonal from one another, as shown in the left side of FIG. 5. However, where the voltages V1 and V2 are different from each other, voltage vectors distorted in level and phase are generated, as shown in the right side of FIG. 5. Also, where the voltages V1 and V2 are equal to each other, a normal voltage, V*, is applied, as shown in the left side of FIG. 6. However, where the voltages V1 and V2 are different from each other, voltages distorted in level and phases are applied.

Such a problem may be basically solved by increasing the capacity of each capacitor. In this case, however, the advantage obtained in terms of costs by the use of four switches is lost.

In order to solve this problem, various methods for achieving a compensation for voltage ripples while maintaining the advantage in terms of costs have been proposed. Now, one example of such methods will be described.

In the case of a space vector PWM method, the switching function may be expressed in the form using the voltages V1 and V2, The following Equation is an example of switching functions at a particular interval:

$$-\frac{\pi}{4} \geq \alpha \frac{\pi}{4}$$ [Equation 2]

$$t_{00} = \frac{3TV_m}{V1+V2}\cos(\alpha) - T\frac{V2-V1}{V1+V2}$$

$$t_{10} = T\frac{V2}{V1+V2} - \frac{\sqrt{3}\,TV_m}{V1+V2}\cos\left(\alpha + \frac{\pi}{4}\right)$$

$$t_{01} = T\frac{V2}{V1+V2} - \frac{\sqrt{3}\,TV_m}{V1+V2}\cos\left(\alpha + \frac{\pi}{4}\right)$$

In accordance with the above method, an actual value is read every time so that they are applied to Equation 2, as compared to the case in which the voltages V1 and V2 are equal to each other.

However, this method involves a complicated calculation, and requires the use of a high-grade microcomputer.

Figure 1:
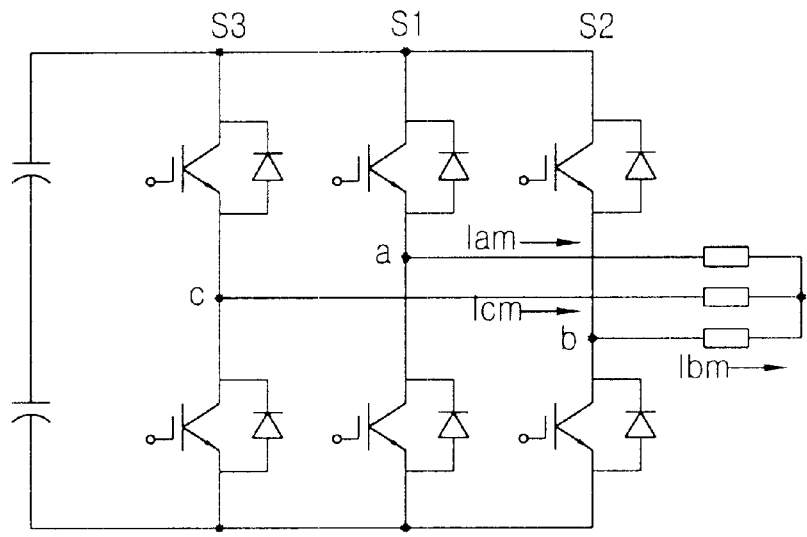
FIG. 1 is a schematic circuit diagram illustrating a conventional 3-phase inverter using six switching elements.
Figure 2:
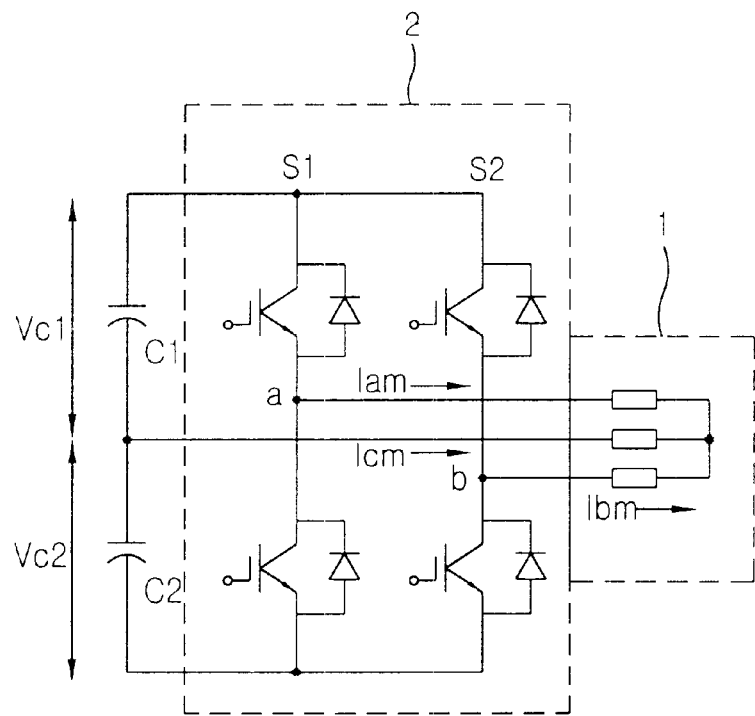
FIG. 2 is a schematic circuit diagram illustrating a conventional 3-phase inverter using four switches.

Therefore, the present invention is intended to provide a method capable of simply compensating for voltage ripples by applying a triangular wave comparison algorithm other than the space vector PWM method, In a configuration having a B4 inverter as in the case of FIG. 2, switching functions S1 and S2 in the space vector PWM method are expressed by the following Equation 3:

$$S1 = \frac{1}{2} + \frac{1}{2}m_f \sin\left(\theta - \frac{\pi}{6}\right)$$ [Equation 3]

$$S2 = \frac{1}{2} + \frac{1}{2}m_f \sin\left(\theta - \frac{\pi}{6} - \frac{\pi}{3}\right)$$

where, "$m_f$" represents a modulation function indicative of the magnitude of a voltage vector.

Referring to the vector diagram applied voltage shown in FIG. 3, it can be found that voltage vectors Vu and Vw respectively corresponding to the switching functions S1 and S2 are retarded from the a-phase voltage Va by 30° and 90°, respectively. Although such retardation angles depend on the phase connected to the connection node between the capacitors in the case of FIG. 2, the same effect may be obtained.

For example, when voltage ripples of the voltages V1 and V2 are generated during the operation of the 3-phase motor, the potential at the connection node between the upper and lower DC link capacitors C1 and C2 is varied.

In this case, respective potentials at nodes a and b are offset by the variation in the potential at the connection node between the capacitors.

These may be expressed in the form of Equations, respectively. That is, switching functions S1 and S2 may be induced as follows:

$$S1 = \frac{V_{C2}}{V_{DC}} + \frac{1}{2}m_f \sin\left(\theta - \frac{\pi}{6}\right)$$ [Equation 4]

$$S2 = \frac{V_{C2}}{V_{DC}} + \frac{1}{2}m_f \sin\left(\theta - \frac{\pi}{6} - \frac{\pi}{3}\right)$$

where, "$V_{DC}$" represents the DC link voltage, and "$V_{C2}$" represents the voltage ripple of the lower DC link capacitor.

Where the voltages V1 and V2 involve the same voltage ripple, the above switching functions S1 and 82 are the same as those of a general triangular wave comparison algorithm. However, where the voltage ripple of the voltage V2 is higher than the voltage ripple of the voltage V1, the offset corresponding to the difference between those voltage ripples is added to the switching functions S1 and S2, respectively, in accordance with the above-mentioned method. Since the compensation values for the switching functions S1 and S2 are equal to each other in this case, balanced 3-phase voltage vectors are generated.

If it is assumed that the DC link voltage is constant, the compensation can then be achieved based only on the potential at the connection node between the capacitors.

Where such a compensation method is used, it is possible to use a simplified triangular wave comparison algorithm. Also, there is no or little increase in computation amount because voltage ripples are compensated for, just like DC offsets.

In other words, even though the switching functions S1 and S2 vary depending on the phase coupled to the connection node between the capacitors in the case of a 3-phase inverter using four switches, the DC offset compensation proposed in accordance with the present invention can be applied to any system, irrespective of the switching functions S1 and S2, to obtain the same effect.

Also, although the switching functions S1 and S2 vary depending on the connection type of the motor, for example, a Y-connection type or a Δ-connection type, the DC offset compensation proposed in accordance with the present invention can be applied to any system, irrespective of the switching functions S1 and S2, to obtain the same effect.

As apparent from the above description, the present invention provides a voltage compensating apparatus and method which uses a general rectifying means and a triac to allow upper and lower DC link capacitors, respectively adapted to supply DC voltages to the B4 inverter stage, to be charged through different paths, respectively, thereby enabling the control of the DC link voltages to achieve a reduction in voltage ripple while minimizing a degradation in performance. Thus, the problem involved due to the use of the B4 inverter stage, that is, the phase distortion resulting from voltage ripples, can be effectively eliminated. Accordingly, the present invention enables the use of a B4 inverter stage while maintaining the advantage of the B4 inverter in terms of costs.

Although the preferred embodiments of the invention have been disclosed for illustrative purposes, those skilled in the art will appreciate that various modifications, additions and substitutions are possible, without departing from the scope and spirit of the invention as recited in the accompanying claims.

What is claimed is:

1. A voltage compensating apparatus for a 3-phase inverter using four switches, comprising:
    upper and lower DC link capacitors connected to each other in series and adapted to receive an input DC voltage, and to respectively charge the DC voltage therein;

a B4 inverter stage for supplying a 3-phase voltage, using the four switches, when it receives the charged voltage from each of the DC link capacitors; and a triac coupled at an input terminal thereof to one line of the AC voltage source while being coupled at an output terminal thereof to a series connection node between the upper and lower DC link capacitors, the triac being operable to control whether or not the upper and lower DC link capacitors are to be charged with the input DC voltage, respectively.

2. A voltage compensating method for a 3-phase inverter using four switches, comprising the steps of:

detecting a zero-crossing point of an input AC voltage at a sampling twice that of the input AC voltage;

reading voltages respectively across upper and lower DC link capacitors charged with input DC voltage rectified from the input AC voltage, for thereby checking voltage ripples involved in the capacitor voltages;

controlling a delay time from the zero-crossing point, based on the checked ripples; and generating a triac control signal, thereby switching on a triac supplying the input DC voltage to the upper and lower DC link capacitors when the controlled delay time elapses.

3. The voltage compensating method according to claim 2, wherein the step of generating the triac control signal comprises the step of:

generating the triac control signal in response to a negative polarity (−) of the input AC voltage if the voltage across the upper DC link capacitor is higher than the voltage across the lower DC link capacitor.

4. The voltage compensating method according to claim 2, wherein the step of generating the triac control signal further comprises the step of:

generating the triac control signal in response to a positive polarity (+) of the input AC voltage if the voltage across the lower DC link capacitor is higher than the voltage across the upper DC link capacitor.

5. The voltage compensating method according to claim 2, wherein the triac control signal is generated at a point in time when the input AC voltage has a predetermined voltage level.

6. In a 3-phase inverter coupling one phase of a 3-phase electric load to a connection node between upper and lower DC link capacitors connected to each other in series and adapted to respectively charge an input DC voltage applied thereto, remaining phases of the 3-phase load being coupled to respective switch legs of a B4 inverter stage, a voltage ripple compensating method comprising the steps of:

checking the input DC voltage;

reading a voltage at a series connection node between the upper and lower DC link capacitors;

checking a ratio between the DC input voltage and the voltage at the connection node;

controlling application of the input DC voltage to the upper and lower DC link capacitors in accordance with a DC offset corresponding to the checked voltage ratio based upon a triangular wave comparison algorithm for compensating voltage ripple in the charged in the upper and lower DC link capacitors.

7. The voltage ripple compensating method according to claim 6, wherein when the voltages respectively across the upper and lower DC link capacitors are different from each other, application of the input DC voltage is controlled according to the triangular wave comparison algorithm is expressed as follows:

$$S1 = \frac{V_{C2}}{V_{DC}} + \frac{1}{2}m_f \sin\left(\theta - \frac{\pi}{6}\right)$$

$$S2 = \frac{V_{C2}}{V_{DC}} + \frac{1}{2}m_f \sin\left(\theta - \frac{\pi}{6} - \frac{\pi}{3}\right)$$

where, "$V_{DC}$" represents the DC input voltage, and "$V_{C2}$" represents the voltage ripple in the lower DC link capacitor.

* * * * *